United States Patent
Lerios et al.

(10) Patent No.: US 9,832,622 B2
(45) Date of Patent: Nov. 28, 2017

(54) SYSTEMS AND METHODS FOR DEVICE-DEPENDENT IMAGE TRANSFORMATIONS

(71) Applicants: Apostolos Lerios, Austin, TX (US); Ryan David Mack, Waltham, MA (US); Peter Ruibal, Palo Alto, CA (US); Dirk John Stoop, Menlo Park, CA (US)

(72) Inventors: Apostolos Lerios, Austin, TX (US); Ryan David Mack, Waltham, MA (US); Peter Ruibal, Palo Alto, CA (US); Dirk John Stoop, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 317 days.

(21) Appl. No.: 13/670,320

(22) Filed: Nov. 6, 2012

(65) Prior Publication Data
US 2014/0129616 A1     May 8, 2014

(51) Int. Cl.
*H04W 4/18*     (2009.01)
*H04W 4/02*     (2009.01)

(52) U.S. Cl.
CPC ............ *H04W 4/18* (2013.01); *H04W 4/021* (2013.01)

(58) Field of Classification Search
CPC ...................................................... H04L 67/10
USPC ......................................................... 709/203
See application file for complete search history.

(56) References Cited

U.S. PATENT DOCUMENTS

| | | | |
|---|---|---|---|
| 2013/0013683 A1* | 1/2013 | Elliott | 709/204 |
| 2013/0238724 A1* | 9/2013 | Cunningham | H04L 51/24 709/206 |

* cited by examiner

*Primary Examiner* — Vivek Srivastava
*Assistant Examiner* — Sibte Bukhari
(74) *Attorney, Agent, or Firm* — Baker Botts L.L.P.

(57) ABSTRACT

Techniques to allow for optimizing an image based on an operational context. An operational context including at least one attribute of a client associated with a user of a social networking system is determined. An optimized image is created based on the operational context for provision to the user. The determining the operational context may comprise receiving a client identifier and determining the at least one attribute of the client based on the client identifier. The determining the operational context may comprise receiving location coordinates and determining quality of a data connection based on the location coordinates. The determining the operational context may comprise determining at least one usage trend in at least one geographic locality. The optimized image is provided to an image repository associated with the at least one geographic locality. The operational context may comprise at least one user-defined setting.

17 Claims, 7 Drawing Sheets

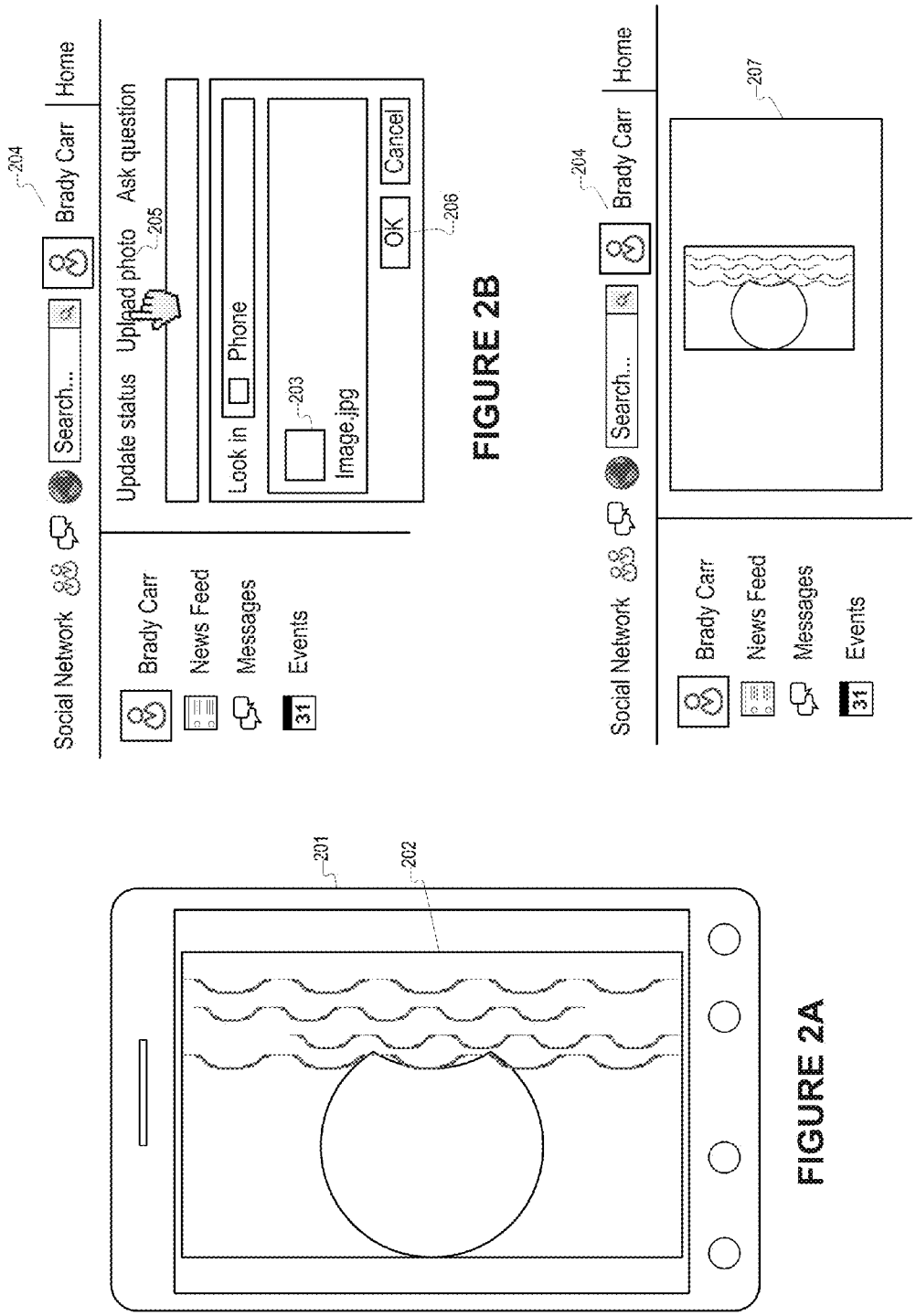

SYSTEMS AND METHODS FOR DEVICE-DEPENDENT IMAGE TRANSFORMATIONS

FIELD OF THE INVENTION

The present invention relates to the field of social networking. More particularly, the present invention provides a technique for providing images to a user of a social networking system.

BACKGROUND

Internet social networks have become a significant phenomenon. Social networks allow an internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Information on a user's profile is often only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends.

Because of their collaborative nature, social networks have now become a popular means by which many people share photos and other media content. Users of a social network may view images stored within the social network on a desktop computer. Similarly, the users of the social network may view images stored within the social network on a mobile device. Each platform on which the users of a social network view images may have its own capabilities and shortcomings.

SUMMARY

To allow for providing images to users of a social networking system, embodiments of the invention include systems, methods, and computer readable media for optimizing an image based on an operational context. An operational context including at least one attribute of a client associated with a user of a social networking system is determined. An optimized image is created based on the operational context for provision to the user.

In an embodiment, the determining the operational context comprises receiving a client identifier and determining the at least one attribute of the client based on the client identifier. In an embodiment, the operational context comprises a resolution value associated with a display of the client. In an embodiment, the operational context comprises a viewing interface of the client. In an embodiment, at least one URL, including an operational context identifier, and an image type identifier associated with the operational context are generated and the at least one URL is embedded within a webpage.

In an embodiment, the determining the operational context comprises receiving location coordinates and determining quality of a data connection based on the location coordinates. In an embodiment, the determining the operational context comprises receiving an IP address and determining quality of a data connection based on the IP address. In an embodiment, the determining the operational context comprises determining a time duration of a handshake to initiate communication between the client and the social networking system and determining quality of a data connection based on the time duration.

In an embodiment, the determining the operational context comprises determining at least one usage trend in at least one geographic locality. In an embodiment, the optimized image is provided to an image repository associated with the at least one geographic locality.

In an embodiment, the operational context comprises at least one user-defined setting. In an embodiment, the at least one user-defined setting is overriding. In an embodiment, the creating the optimized image comprises determining a file format based on the operational context and encoding the optimized image based on the file format. In an embodiment, the creating the optimized image comprises determining a compression value based on the operational context and compressing the optimized image based on the compression value.

In an embodiment, a request is received from the client for an original image associated with the optimized image. In an embodiment, the optimized image is provided to the client. In an embodiment, the client includes at least one of a computing device, an application, and a browser. In an embodiment, the optimized image is provided to an image repository.

Many other features and embodiments of the invention will be apparent from the accompanying drawings and from the following detailed description.

BRIEF DESCRIPTION OF THE DRAWINGS

FIG. 2A illustrates a mobile device displaying a photograph taken by a built-in camera of the mobile device in accordance with an embodiment of the invention.

FIG. 2B illustrates the user accessing a user interface to upload the photograph to the social networking system in accordance with an embodiment of the invention.

FIG. 2C illustrates the photograph uploaded to the social networking system and displayed within a user interface in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

Figure 1:
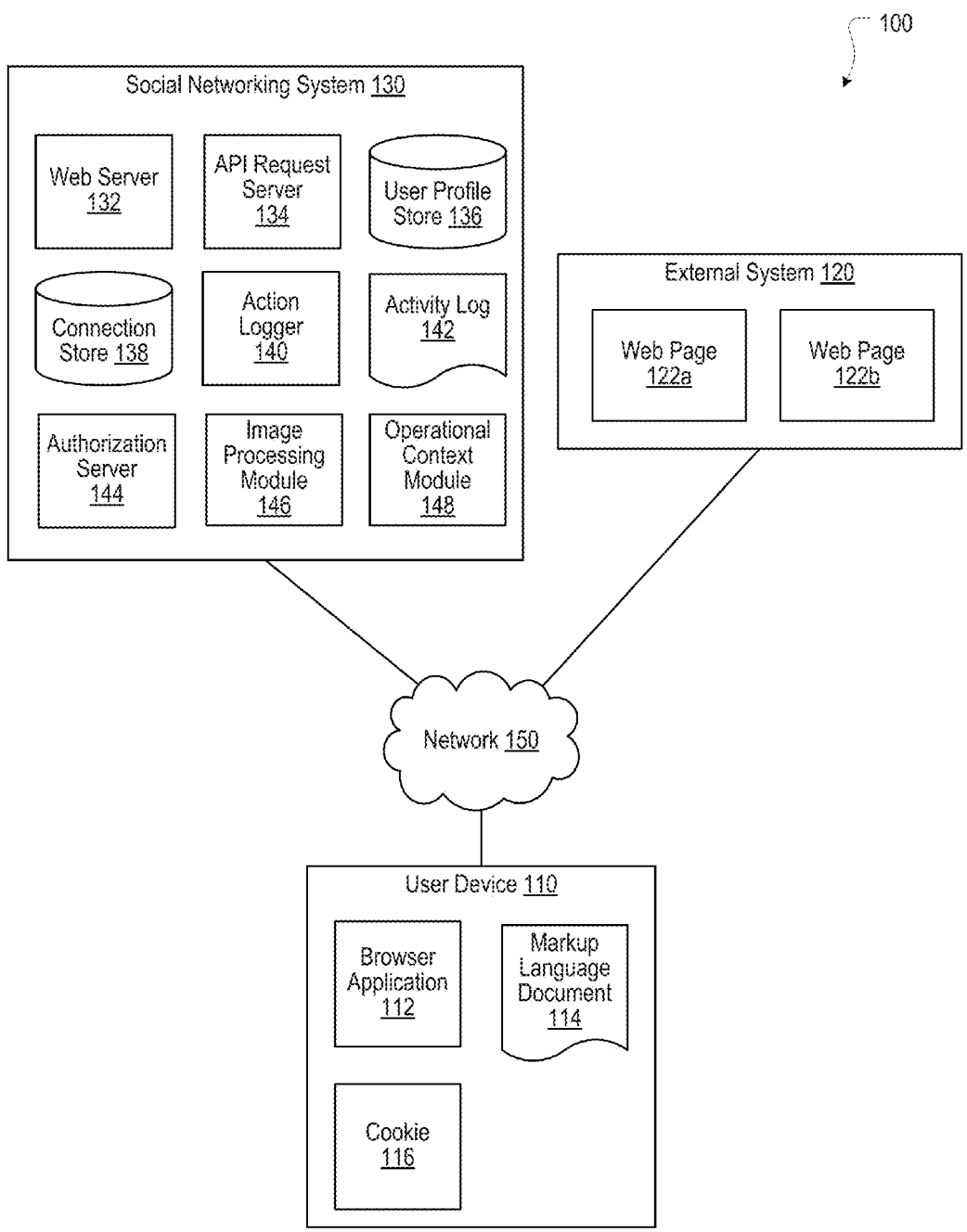
FIG. 1 illustrates a system for creating optimized images for users of a social network in accordance with an embodiment of the invention.

FIG. 1 is a network diagram of a system 100 for providing an image to a user of a social network in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable modification of the data communicated from the social networking system 130 to the user device 110.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 130 may be administered, managed, or controlled by an operator. The operator of the social networking system 130 may be a human being, an automated application, or a series of applications for managing content, regulating policies, and collecting usage metrics within the social networking system 130. Any type of operator may be used.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, an image processing module 146, and an optimization context module 148. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains information about user accounts, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users.

For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may also include an image processing module 146 and an operational context module 148. The operational context module 148 may determine image parameters based on attributes of the operational context of a user. The image processing module 146 may receive images from the user device 110, provide images to the user device 110, create optimized images based on original images and the image parameters received from the operational context module 148, and apply any of the techniques for processing images described herein.

Device-Dependent Image Transformations

Users may take advantage of the collaborative features and functionality of the social networking system 130 to upload and share digital images. A user of the social networking system 130 may upload a profile picture that features prominently on her profile and identifies her to friends and other users. A user may also upload a cover image that may be displayed as a banner across the top of the user's profile. In addition to a profile picture and a cover image, a user may also upload images to share with other users, such as photographs of an event, artwork, professional photography portfolios, photographs from nature, or any other type of digital images.

FIGS. 2A-2C illustrate online image sharing functionality of the social networking system 130 in accordance with an embodiment of the invention. FIG. 2A illustrates an image 202 captured by a user (e.g., "Brady Carr") with the built-in camera of a mobile device 201. The mobile device 201 may be a smartphone, a tablet device, a laptop computer with a built-in camera, or other user device 110. Alternatively, the image 202 may be taken with a standalone camera (not pictured) and transferred to a user device such as a laptop computer or a desktop computer. FIG. 2B illustrates a user interface 204 for uploading the image 202 to the social networking system 130. An "upload" option 205 within the user interface 204 may be selected that prompts the user to browse to the location of the image 202, indicated by the thumbnail 203, on the local storage of the mobile device 201. An "OK" option 206 may be selected when the image 202 is located. In an embodiment, the image 202 may be automatically uploaded to the social networking system 130. FIG. 2C illustrates the image 202 within an image viewing pane 207 of the user interface 204 after the image 202 has been uploaded to the social networking system 130.

Images may be provided, viewed, and edited using a client. A client may refer to a device, an application, an image editing tool, or any hardware or software component used to access or otherwise handle an image. Clients may include publishing clients and consuming clients. A publishing client may refer to a client used to create, edit, or provide an image. In FIGS. 2A-2C, the mobile device 201 whose built-in camera was used to capture the image 202 may be a publishing client. A consuming client may refer to a client used to view an image. In FIGS. 2A-2C, an application or device used to view the image 202 may be a consuming client. Clients send data to and receive data from the social networking system 130 via a data connection. The data connection may be a wired connection, a WiFi wireless connection, a cellular wireless data connection, a satellite connection, or any other connection for sending and receiving data.

The social networking system 130 may have hundreds of millions of users in numerous geographic localities sharing potentially billions of images via the social networking system 130. The capabilities and quality of the clients and data connections, respectively, used to share images may vary greatly. For example, the capabilities of a consuming client and the quality of a data connection used to request an image from the social networking system 130 may be significantly different from the capabilities of a publishing client and the quality of a data connection used to provide the image to the social networking system 130, respectively. Consequently, it may not be efficient or economical for the social networking system 130 to provide to the consuming client an identical copy of an original image that was provided to the social networking system 130 by the publishing client. In addition, the user may prefer to receive images of a certain file format, resolution, size, or other characteristic. The user's geographic locality, the capabilities of a consuming client, the quality of the data connection of the consuming client, the preferences of the user, and any other factor affecting the transmission or display of an image may be collectively referred to as the operational context of the user. The embodiments disclosed herein provide techniques for optimizing an original image to account for an operational context of a requesting user.

Figure 3A:
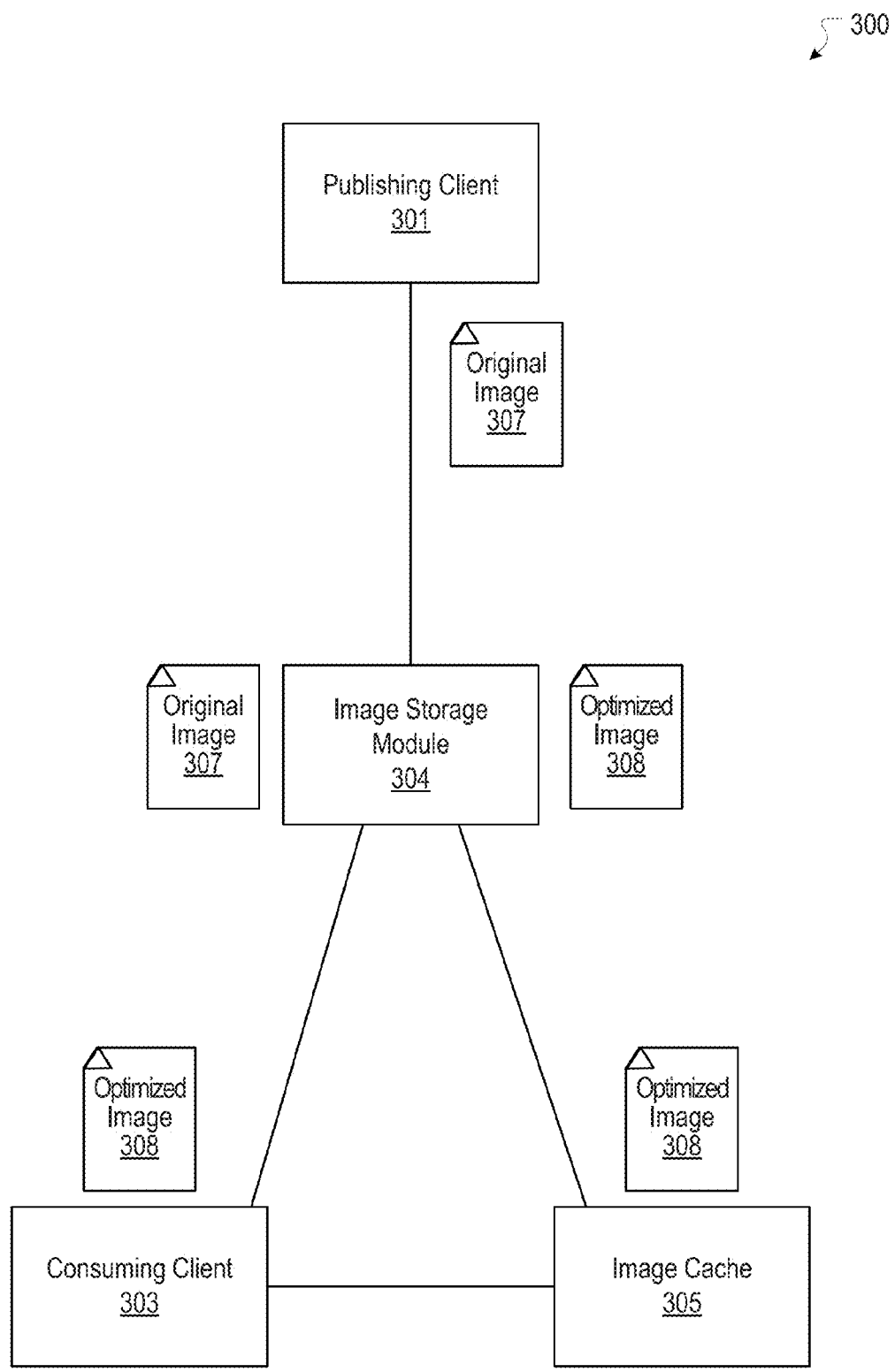
FIG. 3A illustrates an example environment in accordance with an embodiment of the invention.

FIG. 3A illustrates an example environment 300 within which some embodiments of the invention may be implemented. The environment 300 may include a publishing client 301, a consuming client 303, an image storage module 304, and an image cache 305. The publishing client 301 may correspond to a user device 110 from which a user uploads an original image. The publishing client 301 may provide an original image 307 to the image storage module 304, where the original image 307 may be stored. The image storage module 304 may create an optimized image 308 based on the original image 307. The optimized image 308 may be stored in the image storage module 304 or the image cache 305. The optimized image 308 may be provided to the consuming client 303 by the image storage module 304 or the image cache 305. The optimized image 308 may be created in response to a request for an image corresponding to the original image 307 from the consuming client 303. The optimized image 308 may be created at regular intervals and stored in the image cache 305. The consuming client 303 may correspond to a user device 110 that receives, via a data connection, the optimized image 308. According to an embodiment, the image processing module 146 of the social networking system 130 may be implemented to include the image storage module 304 and the image cache 305.

According to an embodiment of the invention, an optimized image may be created from an original image based on an operational context of a consuming client associated with a user who requests the image. The operational context may include the features and capabilities of the consuming client, the quality of the data connection of the consuming client, trends within the locality of the consuming client, preferences of the user, and other attributes. For example, the operational context may include the dots per inch (DPI) that a screen on the consuming client is capable of displaying. As another example, the operational context may include the bandwidth of the data connection. As yet another example, the operational context may include the prevalence of certain types of consuming clients within a geographic locality. As yet another example, the operational context may include a user preference to receive images in a particular file format, resolution, size, or other characteristic. The operational context may be determined when an image is requested or at designated intervals.

Figure 3B:
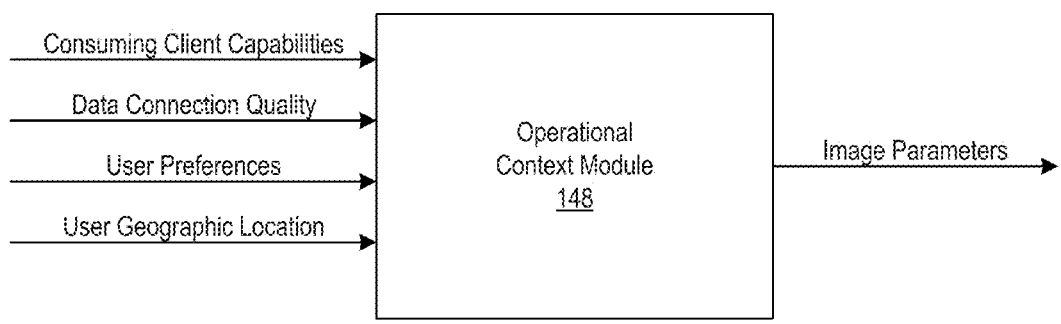
FIG. 3B illustrates an example operational context module in accordance with an embodiment of the invention.

FIG. 3B illustrates an example operational context module 148 for assessing an operational context of a user in accordance with an embodiment of the invention. The social networking system 130 may receive and maintain an image from the publishing client 301. When the image is requested by a user of the consuming client 303, the operational context module 148 may receive inputs such as the capabilities of the consuming client, the quality of the user's data connection, the preferences of the user, the user's geographic location, or any other attributes of the operational context of the user. Based on the inputs, the operational context module 148 may determine image parameters for optimizing the image for provision to the consuming client 303. These image parameters may then be applied by the image processing module 146 to optimize the image.

According to an embodiment of the invention, the operational context may include the capabilities of the consuming client. The capabilities of the consuming client may include, for example, the display of the client device, the graphics processing unit (GPU) of the client device, the features of the client application that requests the image, and the limitations of the interface within which the user is viewing the image. In an embodiment, the capabilities of the consuming client may be determined based on a request received from a consuming client. The request may comprise a uniform resource locator (URL) that specifies information about the consuming client. The information may be appended to or otherwise included with the URL of a requested page or image. The information may be included in the HTTP headers associated with the request. In an embodiment, the information may include a consuming client identifier. The social networking system 130 may determine the capabilities of the consuming client based on the consuming client identifier. Based on the capabilities of the consuming client, the social networking system 130 accordingly may create the optimized image. According to an embodiment, the social networking system 130 may maintain a record of the various consuming client identifiers and the capabilities associated with their corresponding clients within a storage module of the social networking system 130. Upon receiving the consuming client identifier, the social networking system 130 may access the record and determine the capabilities of the consuming client.

The social networking system 130 may optimize the image to remove features that the consuming client lacks the capability to display. For example the social networking system 130 may be able to determine, using the consuming client identifier, that the consuming client has a grayscale display. Thus, the social networking system 130 may create the optimized image as a grayscale image. In another embodiment, the social networking system 130 may determine that rendering images whose resolution exceeds a certain level would be too computationally demanding for a particular consuming client. The social networking system 130 may create the optimized image by reducing the resolution of the original image.

Figure 4:
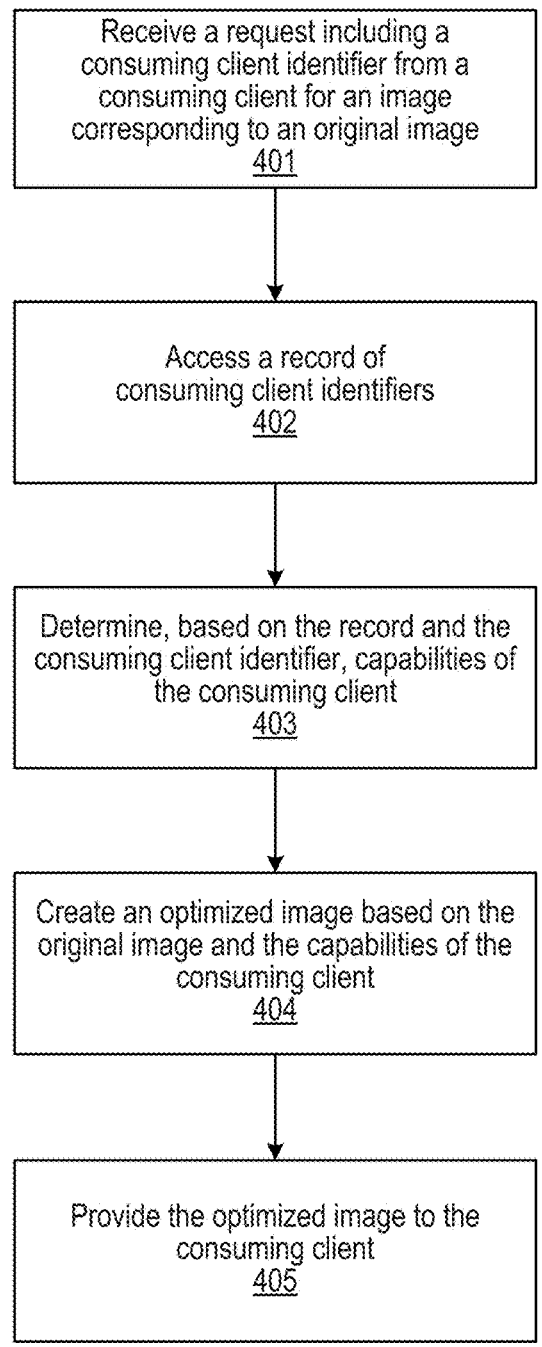
FIG. 4 illustrates a process for providing an image that is optimized based on an operational context in accordance with an embodiment of the invention.

FIG. 4 illustrates a process 400 for optimizing an image based on a client identifier. At block 401, the social networking system 130 receives a request from a consuming client for an image corresponding to an original image. The request may include a consuming client identifier. At block 402, the social networking system 130 accesses a record of consuming client identifiers. At block 403, the social networking system 130 determines, based on the record and the consuming client identifier, capabilities of the consuming client. The capabilities of the consuming client may correspond to the capabilities of the device, portal, or application used to access the social networking system 130. At block 404, the social networking system 130 creates an optimized image based on the original image and the capabilities of the consuming client. At block 405, the social networking system 130 provides the optimized image to the consuming client.

The process 400 may require the social networking system 130 to keep track of numerous consuming clients that request images from the social networking system 130. Consuming clients may include numerous different devices, platforms, browsers, and image-related applications. Keeping track of numerous different clients may potentially be cumbersome and difficult, particularly since many devices, platforms, browsers, and image-related applications may be provided by third parties without the direct knowledge or participation of the social networking system 130. To address this concern, according to an embodiment, the consuming client may provide specific information about its operational context. In this embodiment, the social networking system 130 may not be required to determine the capabilities of the consuming client to create an optimized image. Rather, the consuming client may request a particular type of optimized image from the social networking system 130 based on its capabilities. Accordingly, the social networking system 130 may not be required to determine which type of image is best suited to the capabilities of the consuming client. In an embodiment, a web browser or other application on the consuming client may determine the capabilities of the device using a Javascript procedure or other functionality and append information describing the consuming client, operational context, or requested image type to URLs provided to the social networking system 130.

According to an embodiment of the invention, the social networking system 130 may determine the capabilities of the consuming client based on information provided by the consuming client in a URL. The social networking system 130 may use the information to format subsequent URLs of images provided to the consuming client. For example, a consuming client may request a page by including a client identifier in the URL for the page. The social networking system 130 may receive the client identifier and determine that the client identifier corresponds to an operational context in which the consuming client has a maximum display resolution of 2048×1024. Based on this information, the social networking system 130 may format the image URLs included in the page to include values that specify exactly which type of image should be requested by the consuming client. For example, the social networking system 130 may append a string "?size=2048×1024" to an image URL "http://www.socialnetworkingsystem.com/myimage.jpg" embedded within the page. When a user selects an image URL within the page, the consuming client may request from the social networking system 130 an image whose size is 2048×1024.

According to an embodiment, the capabilities of the consuming client may include an interface within which a user is viewing content of the social networking system 130 on the consuming client. For example, the user may be using a consuming client with a large display and a powerful graphics processing unit, but may be accessing the social networking system 130 from within a web browser window that only occupies a small portion of the display. The contents of the web browser window may be downsized to fit within the smaller interface, and the social networking system 130 accordingly may provide a downscaled image that fits within the smaller interface. As another example, the size of the browser window may be adjusted such that portions of the web page may not be visible within the web browser window. The social networking system 130 may provide only the portion of the image that is visible.

According to an embodiment of the invention, the capabilities of the consuming client may include the ability of the consuming client to interpret certain metadata. An original image may have associated metadata specifying time, data, location, color profile, or other information about the original image. Many consuming clients may lack the capability to interpret metadata. Providing the metadata to such a consuming client would result in an inefficient use of resources by the social networking system 130 or the consuming client. The social networking system 130 may create an optimized image by omitting metadata associated with an original image if the consuming client lacks the ability to interpret the metadata. For example, many consuming clients may lack the capability to process color profile information. A consuming client that cannot process color profile information may render images according to its own default color specification without reference to a color profile received with an image. Thus, upon receiving a request for an original image from a consuming client that cannot process color profile information, the social networking system 130 may create an optimized image based on the original image by omitting color profile information from the original image.

According to an embodiment of the invention, the capabilities of the consuming client may include the suitability of the consuming client for certain file formats and compression techniques. Different file formats may be ideally suited for images of different sizes. For example, a consuming client device may have a screen with a very high DPI. The social networking system 130 may create the optimized image by encoding the original image in a file format that most efficiently takes advantage of the high quality screen on the consuming client device and avoids the appearance of pixilation in the optimized original image. Different file formats may also be supported by different consuming clients. For example, a consuming client may not support progressive JPEG images. Progressive JPEG is a file format in which image data is compressed in multiple passes of progressively higher detail. If the original file is encoded in the progressive JPEG format and the consuming client does not support progressive JPEG images, the social networking system 130 may create the optimized image by encoding the original image in a non-progressive JPEG format.

According to an embodiment of the invention, the social networking system 130 may create an optimized image by adjusting a compression value associated with an original image. Some image file formats may support varying levels of compression. For example, an original image may be encoded in the JPEG format with a compression value of 500. If the image is requested by a consuming client that cannot display JPEG images with an associated compression value of less than 1000, the social networking system 130 may create an optimized image by increasing the compression value of the original image from 500 to 1000.

As shown in FIG. 3B, according to an embodiment of the invention, operational context may include the quality of the data connection of the user. The quality of the data connection of the user may include, for example, the bandwidth of the data connection, the average data transfer rates of the data connection, or the extent and frequency with which the data transfer rates fluctuate. The optimized image may be created based on the quality of the user's data connection. For example, a consuming client may have advanced technical capabilities but may be accessing the social networking system 130 using a low-speed data connection. The social networking system 130 may detect the low-speed data connection and create the optimized image so that its data size is reduced to accommodate the low-speed data connection. In an embodiment, the quality of the user's data connection may be determined based on the frequency and extent to which the speed of the user's data connection fluctuates. For example, the user's data connection may sporadically achieve high data transfer rates, but may be unable to sustain these rates for significant lengths of time. The data transfer rates may rapidly diminish due to interference from other wireless signals, high network traffic, or other reasons. The data connection may be determined to be of low quality even if the peak data transfer rates achieved over the data connection are relatively high. In an embodiment, the consuming client may detect the low-quality data connection and request the optimized image accordingly.

According to an embodiment of the invention, the quality of the data connection may be determined by the social networking system 130 based on an IP address from which a consuming client has accessed the social networking system 130. The social networking system 130 may maintain a record of IP addresses and a rating of the quality of the data connection associated with each IP address. The record may have been developed by the social networking system 130 based on an analysis of historical traffic and usage data. In an embodiment, the record may have been acquired from an external source. From the record, the social networking system 130 may determine the quality of the data connection associated with the IP address and create an optimized image based on the quality of the data connection.

According to an embodiment of the invention, the quality of the data connection may be determined based on the location of the consuming client device. Many devices may include Global Positioning System (GPS) capabilities, which allow the geographic location of the device to be determined using navigation satellites. The location of the consuming client device may be determined and expressed as location coordinates. The social networking system 130 or the consuming client may cross-reference the location coordinates against maps that include information about the quality of data connections in an area. For example, the social networking system 130 or the consuming client may determine that the consuming client has accessed the social networking system 130 from an area in which the average bandwidth of data connections is low. As another example, the social networking system 130 may determine, based on the location coordinates, that the consuming client has accessed the social networking system 130 from within a tunnel, parking garage, or other structure in which wireless signals may be relatively weak and data transfer rates may be impaired. The social networking system 130 may create an optimized image based on the quality of the data connection as impacted by the location coordinates of the consuming client.

According to an embodiment of the invention, the quality of the data connection may be determined based on the amount of time required for the consuming client to connect to the social networking system 130. The amount of time required for the consuming client to connect to the social networking system 130 may be determined based on the handshake between the consuming client and the social networking system 130. Handshaking refers to the procedure of establishing a wireless or wired communication link between two distinct computing entities. In a handshake, a first computing entity initiates communication with a second computing entity, and the entities exchange messages and acknowledgements until parameters of communication are determined and a connection is established. The social networking system 130 may initialize a timer when a handshake is initiated and stop the timer when the handshake is completed and a connection has been established. The social networking system 130 may correlate the handshake time as measured by the timer with a data connection quality and create an optimized image accordingly.

According to an embodiment of the invention, operational context may include preferences specified by the user. The preferences of the user may include, for example, file format and image resolution. In one embodiment, the type of image requested by a consuming client may be influenced by settings specified by the user of the consuming client. For example, the user may be using a consuming client with a large display, a powerful graphics processing unit, or a high-bandwidth data connection, but nonetheless may wish to receive lower-quality images than the consuming client is capable of rendering. For example, the user's vision may be limited such that he cannot perceive the differences between high quality and low quality images. As another example, the user's data connection may be subject to usage constraints or per-kilobyte charges imposed by his wireless carrier or internet service provider (ISP). As yet another example, the user may perform numerous tasks simultaneously on the consuming client and thus may wish to minimize the computing time or resources devoted to rendering images from the social networking system 130. Due to these or other factors, the user may specify criteria that restrict the size of the images he receives. The criteria may be overriding criteria that supersede other factors included in the operational context in the determination of a suitable optimized image. The criteria may bias the determination by the social networking system 130 of the type of image to be provided to the consuming client based on the operational context.

According to an embodiment of the invention, the operational context may include the geographic location of the user. Based on the geographic location of the user, the social networking system 130 may determine, for example, that an image requested by the user should be provided from a particular storage module. Images may be cached in one or more storage modules. The images may be cached based on, for example, usage trends within a geographic locality. The social networking system 130 may observe, based on usage data from within a particular locality, that some aspects of the operational contexts are common across users who may access the social networking system 130 from within the locality. Upon receiving an original image, the social networking system 130 may optimize the original image based on these aspects and store the optimized image in a storage module for provision to users within the particular locality. The optimized images may be generated upon receipt of the original images by the social networking system 130 or at periodic intervals. Generating an optimized image upon receipt of the original image or at periodic intervals avoids the need to dynamically generate an optimized image each time the image is requested by a user of the social networking system 130.

For example, the social networking system 130 may observe that most of the users who access the social networking system 130 from North America use a particular type of consuming client device, whereas most of the users who access the social networking system 130 from Southeast Asia use a different type of consuming client device. The social networking system 130 may create a first optimized image based on the consuming client device commonly used in North America and a second optimized image based on the consuming client commonly used in Southeast Asia. The first and second optimized images may be stored within separate storage modules designated for providing images to users in North America and Southeast Asia, respectively.

According to an embodiment of the invention, a storage module, such as a cache, may include reserved space for optimized images that are consistently requested within the social networking system 130. The reserved space may allow for storage of images that are requested at a consistent rate to prevent allocation of the entire capacity of the storage module to other images when there is a temporary spike in the popularity of the other images. For example, profile pictures of users of the social networking system 130 are consistently accessed during the normal use of the social networking system 130. In contrast, requests for images of a particular celebrity may increase suddenly if the celebrity is in the news. If there is no space reserved within the storage module for users' profile pictures, then capacity within the storage module that normally would be allocated to profile pictures could instead be allocated to images of the celebrity. Such memory space allocation for high volume, yet ephemeral, requests for images may cause a delay and inconvenience in the provision of profile pictures to users. By reserving memory space for images that are consistently requested, the social networking system 130 may avoid delay and inconvenience to users who request profile pictures.

According to an embodiment of the invention, optimized images may be pre-loaded on a consuming client before they are accessed by the user. For example, a user may be browsing images in a photo album on the social networking system 130. The optimized images may be created based on the operational context as determined at any one of various times during which the user may access the photo album. In an embodiment, if the consuming client or the social networking system 130 detects that the operational context of the user has changed, a new optimized image may be generated based on the new operational context and displayed in lieu of the pre-loaded optimized image. Alternatively, in an embodiment, the consuming client may disregard the new operational context and display the pre-loaded optimized image.

Figure 5:
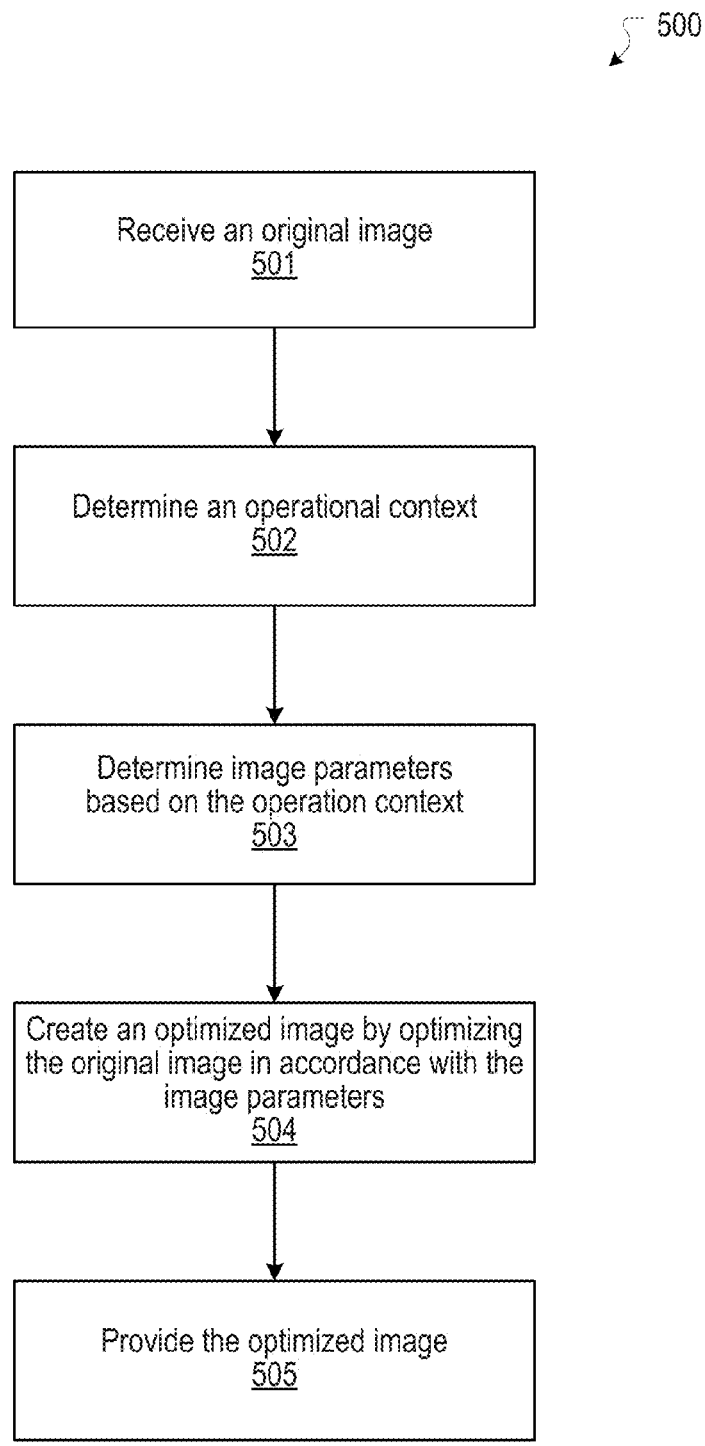
FIG. 5 illustrates a process for optimizing an image based on a client identifier in accordance with an embodiment of the invention.

FIG. 5 illustrates a process 500 for providing an image that is optimized based on an operational context. At block 501, the social networking system 130 receives an original image from a publishing client. The original image may be provided to the social networking system 130 by a publishing client. At block 502, the social networking system 130 determines an operational context. The operational context may include the features and capabilities of the consuming client. The operational context may include the quality of the data connection by which the consuming client communicates with the social networking system 130. The operational context may include the preferences of the user. The operational context may include the geographic locality of the user. Any factors may be included in the operational context. At block 503, the social networking system 130 determines image parameters based on the operational context. The image parameters may specify that the original image should be re-sized, compressed, blurred, or be subject to any other operation or transformation. At block 504, the social networking system 130 creates an optimized image by optimizing the original image in accordance with the image parameters. At block 505, the social networking system 130 provides the optimized image. The optimized image may be provided to a consuming client in response to a request or may be provided to an image cache that stores images to be delivered to consuming clients at later times.

Hardware Implementation

Figure 6:
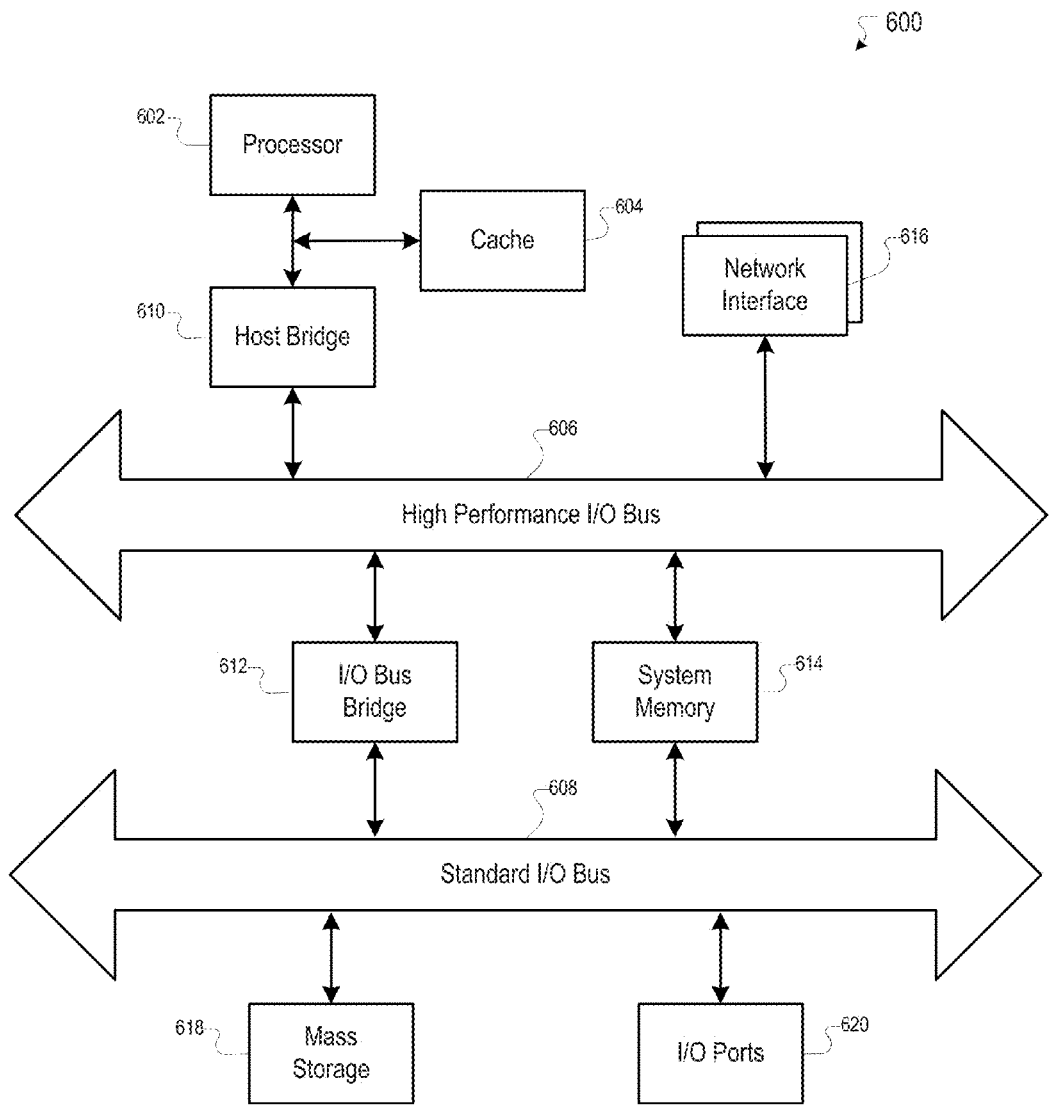
FIG. 6 illustrates an example of a computer system in accordance with an embodiment of the invention.

The foregoing processes and features can be implemented by a wide variety of machine and computer system architectures and in a wide variety of network and computing environments. FIG. 6 illustrates an example of a computer system 600 that may be used to implement one or more of the embodiments described herein. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 130, the user device 110, and the external system 120, or a component thereof. In an embodiment of the invention, the computer system 600 may be one server among many that constitutes all or part of the social networking system 130.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
   receiving a client identifier from a client device associated with a user of a social-networking system;
   establishing, based on the client identifier, a wireless communication link with the client device, wherein the wireless communication link is established after a particular duration of time has passed;
   determining based on the particular duration of time being above a threshold duration, an operational context indicating that quality of a data connection with the client device is too low to transmit an image in its original form;

determining one or more image parameters based on the operational context of the client device, wherein the image parameters:
  specify creation of an optimized image that is based on the image in its original form; and
  comprises one or more modifications for the optimized image, wherein the modifications reduce the data size of the optimized image;
creating the optimized image based on the image parameters for provision to the user; and
providing the optimized image to the client device and to an image repository.

2. The computer implemented method of claim 1, wherein the determining the operational context further comprises:
receiving a client identifier; and
determining the at least one attribute of the client device based on the client device identifier.

3. The computer implemented method of claim 1, wherein the determining the operational context further comprises:
receiving location coordinates; and
determining quality of the data connection based on the location coordinates.

4. The computer implemented method of claim 1, wherein the determining the operational context further comprises:
receiving an IP address; and
determining quality of the data connection based on the IP address.

5. The computer implemented method of claim 1, wherein the determining the operational context further comprises determining at least one usage trend in at least one geographic locality.

6. The computer implemented method of claim 5, further comprising providing the optimized image to an image repository associated with the at least one geographic locality.

7. The computer implemented method of claim 1, wherein the operational context comprises at least one user-defined setting.

8. The computer implemented method of claim 7, wherein the at least one user-defined setting is overriding.

9. The computer implemented method of claim 1, wherein the operational context comprises a resolution value associated with a display of the client device.

10. The computer implemented method of claim 1, further comprising receiving a request from the client device for the image in its original form.

11. The computer implemented method of claim 1, wherein the operational context comprises a viewing interface of the client device.

12. The computer implemented method of claim 1, further comprising:
generating at least one URL including an operational context identifier and an image type identifier associated with the operational context; and
embedding the at least one URL within a webpage.

13. The computer implemented method of claim 1, wherein the creating the optimized image further comprises:
determining a file format based on the operational context; and
encoding the optimized image based on the file format.

14. The computer implemented method of claim 1, wherein the creating the optimized image comprises:
determining a compression value based on the operational context; and
compressing the optimized image based on the compression value.

15. The computer implemented method of claim 1, wherein the client device includes at least one of a computing device, an application, and a browser.

16. A system comprising:
at least one processor; and
a memory storing instructions configured to instruct the at least one processor to perform:
  receiving a client identifier from a client device associated with a user of a social-networking system;
  establishing, based on the client identifier, a wireless communication link with the client device, wherein the wireless communication link is established after a particular duration of time has passed;
  determining based on the particular duration of time being above a threshold duration, an operational context indicating that quality of a data connection with the client device is too low to transmit an image in its original form;
  determining one or more image parameters based on the operational context of the client device, wherein the image parameters:
    specify creation of an optimized image that is based on the image in its original form; and
    comprises one or more modifications for the optimized image, wherein the modifications reduce the data size of the optimized image;
  creating the optimized image based on the image parameters for provision to the user; and
  providing the optimized image to the client device and to an image repository.

17. A non-transitory computer storage medium storing computer-executable instructions that, when executed, cause a computer system to perform a computer-implemented method comprising:
receiving a client identifier from a client device associated with a user of a social-networking system;
establishing, based on the client identifier, a wireless communication link with the client device, wherein the wireless communication link is established after a particular duration of time has passed;
determining based on the particular duration of time being above a threshold duration, an operational context indicating that quality of a data connection with the client device is too low to transmit an image in its original form;
determining one or more image parameters based on the operational context of the client device, wherein the image parameters:
  specify creation of an optimized image that is based on the image in its original form; and
  comprises one or more modifications for the optimized image, wherein the modifications reduce the data size of the optimized image;
creating the optimized image based on the image parameters for provision to the user; and
providing the optimized image to the client device and to an image repository.

* * * * *